(12) United States Patent
Kim et al.

(10) Patent No.: US 8,116,538 B2
(45) Date of Patent: Feb. 14, 2012

(54) SYSTEM AND METHOD FOR VERIFYING FACE OF USER USING LIGHT MASK

(75) Inventors: Hyun-Soo Kim, Yongin-si (KR); Je-Han Yoon, Seongnam-si (KR); Ji-Hyo Lee, Yongin-si (KR); Jae-Yeon Lee, Daejeon (KR); Su-Young Chi, Daejeon (KR); Woo-Han Yun, Daejeon (KR)

(73) Assignees: Samsung Electronics Co., Ltd. (KR); Electronics and Telecommunications Research Institute (KR)

( * ) Notice: Subject to any disclaimer, the term of this patent is extended or adjusted under 35 U.S.C. 154(b) by 953 days.

(21) Appl. No.: 12/115,905

(22) Filed: May 6, 2008

(65) Prior Publication Data

US 2008/0279426 A1 Nov. 13, 2008

(30) Foreign Application Priority Data

May 9, 2007 (KR) ........................ 10-2007-0044981

(51) Int. Cl.
*G06K 9/00* (2006.01)
*G06K 9/62* (2006.01)
*G06K 9/46* (2006.01)
*G06F 21/00* (2006.01)

(52) U.S. Cl. ........ 382/118; 382/160; 382/165; 382/190; 382/225; 713/186

(58) Field of Classification Search .................. 382/118, 382/160, 165, 190, 225; 713/186
See application file for complete search history.

(56) References Cited

U.S. PATENT DOCUMENTS

| 6,160,903 | A | * | 12/2000 | Hamid et al. | ................. | 382/115 |
| 2001/0000025 | A1 | * | 3/2001 | Darrell et al. | ................. | 382/103 |
| 2003/0165260 | A1 | * | 9/2003 | Kim et al. | ..................... | 382/118 |
| 2003/0225719 | A1 | * | 12/2003 | Juang et al. | ..................... | 706/48 |
| 2005/0105780 | A1 | * | 5/2005 | Ioffe | ............................. | 382/118 |

(Continued)

FOREIGN PATENT DOCUMENTS

KR 1020030066512 8/2003

(Continued)

OTHER PUBLICATIONS kato et al, Face Recognition Using Surface Features in XYI space, 2005, IEEE Acoustics, Speech and Signal Processing, pp. 457-459.*

(Continued)

*Primary Examiner* — Kathleen Y Dulaney
(74) *Attorney, Agent, or Firm* — The Farrell Law Firm, P.C.

(57) ABSTRACT

A system and method for verifying the face of a user using a light mask are provided. The system includes a facial feature extraction unit for extracting a facial feature vector from a facial image received from a camera. A non-user Gaussian Mixture Model (GMM) configuration unit generates a non-user GMM from a facial image stored in a non-user database (DB). A user GMM configuration unit generates a user GMM by applying light masks to a facial image stored in a user DB. A log-likelihood value calculation unit inputs the facial feature vector both to the non-user GMM and to the user GMM, thus calculating log-likelihood values. A user verification unit compares the calculated log-likelihood values with a predetermined threshold, thus verifying whether the received facial image is a facial image of the user.

5 Claims, 7 Drawing Sheets

U.S. PATENT DOCUMENTS

| | | | |
|---|---|---|---|
| 2006/0008149 A1* | 1/2006 | Tu et al. | 382/190 |
| 2006/0015497 A1* | 1/2006 | Keating et al. | 707/6 |
| 2006/0053014 A1* | 3/2006 | Yoshizawa | 704/256.4 |
| 2006/0123241 A1* | 6/2006 | Martinian et al. | 713/186 |
| 2006/0136205 A1* | 6/2006 | Song | 704/243 |
| 2007/0052858 A1* | 3/2007 | Zhou et al. | 348/584 |
| 2007/0174633 A1* | 7/2007 | Draper et al. | 713/186 |
| 2008/0059183 A1* | 3/2008 | Liu et al. | 704/256 |

FOREIGN PATENT DOCUMENTS

| | | |
|---|---|---|
| KR | 1020050091558 | 9/2005 |

OTHER PUBLICATIONS

Sung et al, Example Based Learning for View-Based Human Face Detection, 1998, IEEE transactions on pattern analysis and machine intelligence, vol. 20, No. 1, pp. 39-51.*

Sanderson et al, On local features for GMM based face verification, 2005 IEEE, pp. 1-6.*

Mitra et al, Gaussina Mixture Models based on the Phase spectra for Illumination Invariant Face Identification on the Yale Database, 2007 IEEE, pp. 1-6.*

* cited by examiner

SYSTEM AND METHOD FOR VERIFYING FACE OF USER USING LIGHT MASK

PRIORITY

This application claims priority under 35 U.S.C. §119(a) to a Korean Patent Application filed in the Korean Intellectual Property Office on May 9, 2007 and assigned Serial No. 2007-44981, the disclosure of which is incorporated herein by reference.

BACKGROUND OF THE INVENTION

1. Field of the Invention

The present invention relates generally to a system and method for verifying the face of a user using a light mask, and in particular, to a system and method for recognizing an image input through a camera and verifying a registered user in a robotic environment.

2. Description of the Related Art

In the prior art, there are many technologies for recognizing and verifying a face. Conventional face verification technologies are mainly related to a process for dividing a facial image into blocks, extracting features from respective blocks, and creating Gaussian Mixture Models (GMMs). The division of a facial image into blocks is shown in FIG. 1A. In the method of dividing a facial image into small blocks and extracting features from the blocks in this way, GMM learning may be excellently performed because a plurality of data items can be obtained using a small number of images, but learning and adaptation time and verification time may increase due to the increased number of GMMs, and the entire facial image may not be sufficiently taken into account.

SUMMARY OF THE INVENTION

An aspect of the present invention is to address at least the above problems and/or disadvantages and to provide at least the advantages described below. Accordingly, an aspect of the present invention is to provide a face verification system and method that extract features from an entire facial area, unlike a conventional method of dividing a facial area into blocks and extracting facial features from the blocks, thus sufficiently taking into account the entire facial area. In detail, facial features are extracted from the entire facial area, as shown in FIG. 1B according to the present invention, without the entire facial area being separately divided into blocks.

Another aspect of the present invention is to provide a face verification system and method, which increase the amount of data through linear transformation that applies light masks to a face, in order to cope with situations in which the amount of data extracted through feature extraction from the entire facial area is decreased. In detail, as shown in FIG. 2, a single facial image is combined with light masks having various effects of directing illumination in various directions, so that various facial images, in which a face is illuminated in various directions, can be created. In this way, a face is verified using light masks, and thus the present invention provides a face verification system and method using light masks, which can overcome the vulnerability of the conventional face verification system and method to illumination.

According to one aspect of the present invention, there is provided a system for verifying a face of a user using a light mask. The system includes a facial feature extraction unit for extracting a facial feature vector from a specific facial image, a non-user Gaussian Mixture Model (GMM) configuration unit for generating a non-user GMM from a non-user facial image stored in a non-user database (DB), a user GMM configuration unit for generating a user GMM by applying light masks to a user facial image stored in a user DB, a log-likelihood value calculation unit for inputting the facial feature vector both to the non-user GMM and to the user GMM, thus calculating log-likelihood values, and a user verification unit for comparing the calculated log-likelihood values with a predetermined threshold, thus verifying whether the specific facial image is a facial image of the user.

According to another aspect of the present invention, there is provided a method of verifying a face of a user using a light mask. The method includes extracting a facial feature vector from a specific facial image, calculating log-likelihood values by inputting the facial feature vector to a Gaussian Mixture Model (GMM) configuration unit for storing a non-user GMM and a user GMM, storing a non-user GMM, generated from a non-user facial image stored in a non-user Database (DB) required to calculate log-likelihood values, and a user GMM, generated by applying light masks to a user facial image stored in a user DB, comparing the calculated log-likelihood values with a predetermined threshold, thus verifying whether the specific facial image is a facial image of the user.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF PREFERRED EMBODIMENTS

Figure 1A:
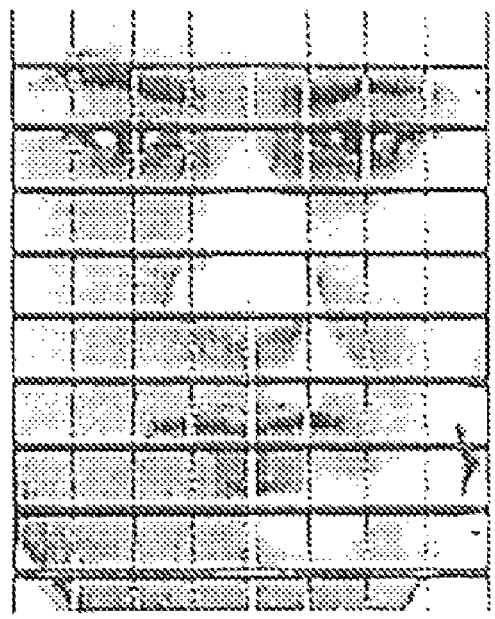
FIGS. 1A and 1B are, respectively, diagrams showing examples of division of a facial area into blocks according to the prior art, and of facial feature extraction from an entire facial area according to an embodiment of the present invention.
Figure 1B:
Figure 2A:
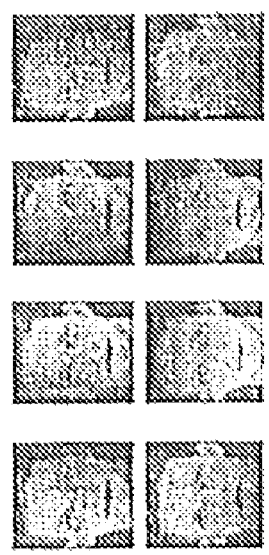
FIGS. 2A to 2C are diagrams showing examples of facial image processing using light masks according to an embodiment of the present invention.
Figure 2B:
Figure 2B:
Figure 2B:
Figure 2B:
Figure 2B:
Figure 2B:
Figure 2C:
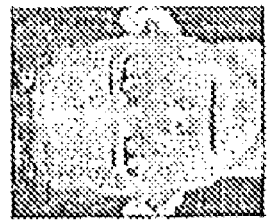

Preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for clarity and conciseness.

Figure 3:
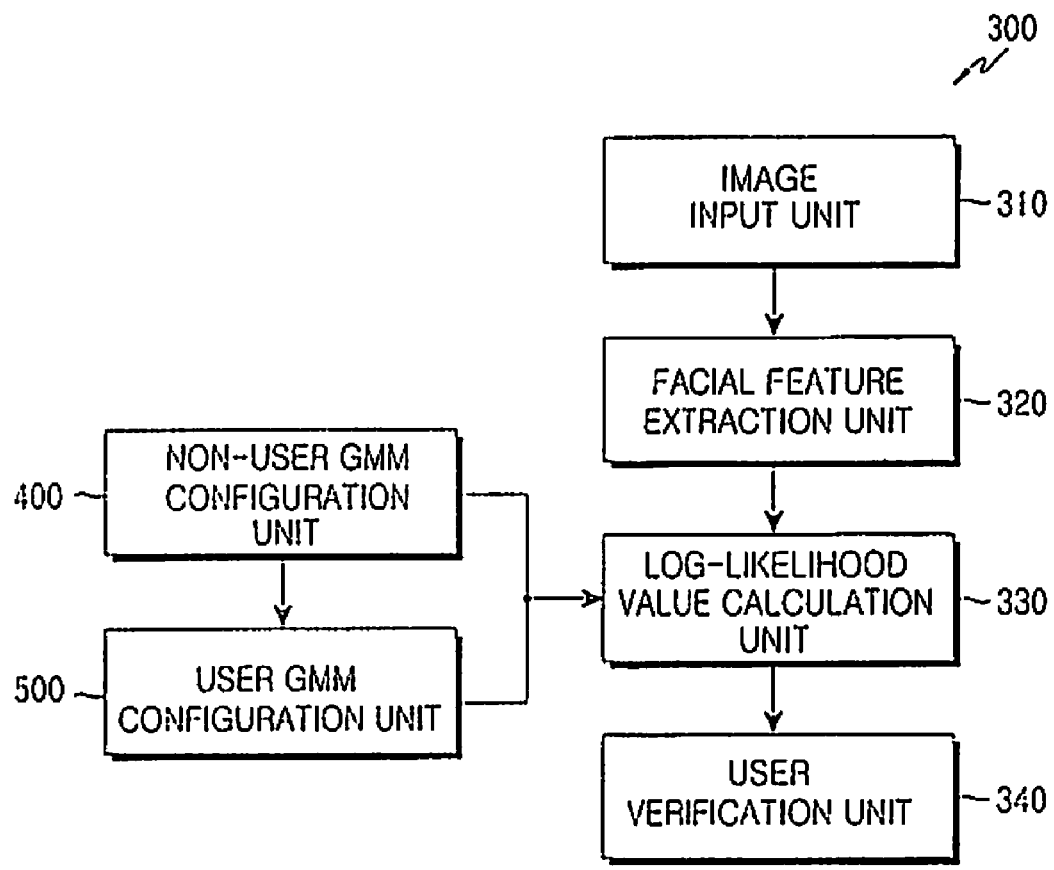
FIG. 3 is a diagram showing the construction of a system for verifying the face of a user using a light mask according to an embodiment of the present invention.

FIG. 3 is a diagram showing the construction of a system for verifying the face of a user using a light mask according to an embodiment of the present invention. Referring to FIG. 3, a system 300 for verifying the face of a user using a light mask (hereinafter 'user face verification system') includes an image input unit 310, a facial feature extraction unit 320, a non-user GMM configuration unit 400, a user GMM configuration unit 500, a log-likelihood value calculation unit 330, and a user verification unit 340. The components of the user face verification system 300 are described below. The image input unit 310 receives a specific facial image from a camera or the like mounted on a robot. The image input unit 310 is not limited to the camera, but may include any components, such as diskettes, to which images can be input, without requiring a procedure for capturing an image using a camera.

The facial feature extraction unit 320 performs preprocessing on the specific facial image received from the image input unit 310, and thereafter extracts a facial feature vector from the preprocessed image. The facial feature vector can be extracted using an entire facial area as a unit for facial feature extraction.

The non-user GMM configuration unit 400 generates and stores a non-user GMM for the non-user facial image of each non-user registered in a non-user DB. The user GMM configuration unit 500 generates and stores a user GMM for the user facial image of each user registered in a user DB. In particular, the user GMM configuration unit 500 generates facial images illuminated by a plurality of lighting devices by applying light masks to the facial feature vector extracted from the facial feature extraction unit 320. Therefore, the amount of data about the facial feature vector increases, and verification probability can be increased when user verification is performed. Construction related to the generation of a typical GMM will be described later.

The log-likelihood value calculation unit 330 calculates log-likelihood values by inputting the facial feature vector, extracted from the facial feature extraction unit 320, both to the non-user GMM and to the user GMM. Equation [1] indicates a procedure for calculating log-likelihood values. When there is a plurality of users, a plurality of resultant values for the user GMM is obtained. In this case, the largest log-likelihood value is taken and calculated.

$$z = \log(p(X|S_{Family})) - \log(p(X|S_{General})) \quad [1]$$

The user verification unit 340 compares the value z, obtained by the log-likelihood value calculation unit 330, with an actual threshold, thus verifying whether the face in the image received from the image input unit 310 is the user's face. When the value z is equal to or greater than the threshold, the specific facial image is determined to be the user's face, whereas, when the value z is less than the threshold, the specific facial image is determined to be the non-user's face.

Figure 4:
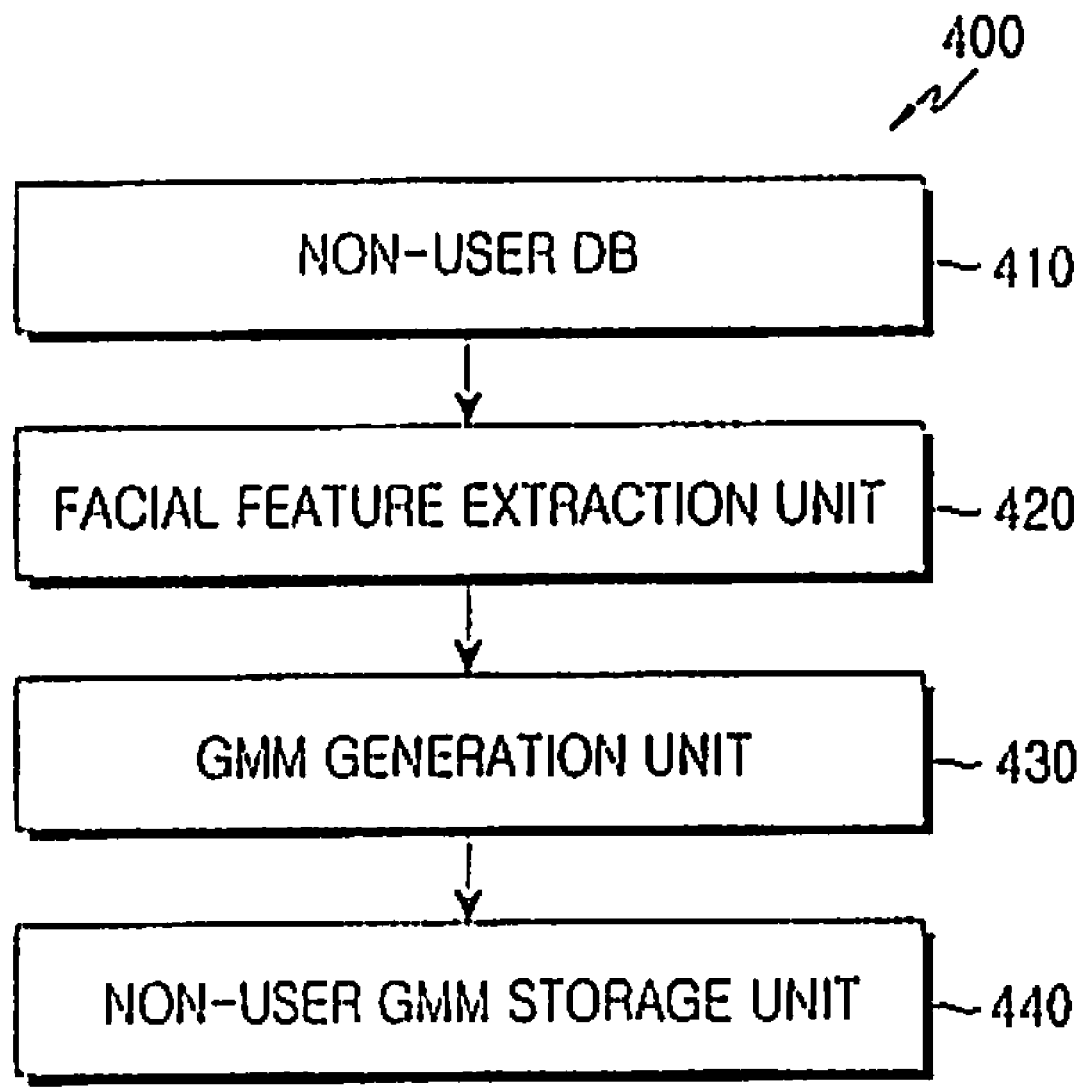
FIG. 4 is diagram showing the construction of a non-user Gaussian Mixture Model (GMM) configuration unit according to an embodiment of the present invention.

FIG. 4 is a diagram showing the non-user GMM configuration unit 400 according to an embodiment of the present invention. Referring to FIG. 4, facial features are extracted by a facial feature extraction unit 420 from the facial image of each non-user registered in a non-user DB 410. Although not shown in the drawing, before a facial feature vector is extracted, preprocessing is primarily performed by the facial feature extraction unit 420 on the facial image, and the facial feature vector is subsequently extracted. For preprocessing, geometric normalization for aligning the location of a face on the basis of eyes and histogram normalization for adjusting the brightness of an image are performed. When facial features are extracted, principal component analysis can be used. A GMM generation unit 430 generates a non-user GMM using the features extracted in this way, and stores the non-user GMM in a non-user GMM storage unit 440.

A procedure actually performed by the non-user GMM configuration unit 400 is represented by the following equations. When the number of facial images stored in the non-user DB 410 is N and is represented by X=[x1, ..., xN], data about the facial images is modeled in the form of a Gaussian Mixture Model (GMM). Typically, Gaussian probability density is obtained by the following Equation [2] when the dimension of facial image data is D and facial image data is x.

$$p(x) = \frac{1}{(2\pi)^{\frac{D}{2}}|\Sigma|^{\frac{1}{2}}} \exp\left[-\frac{1}{2}(x-\mu)^T \sum{}^{-1}(x-\mu)\right] \quad [2]$$

A plurality of Gaussian probability densities forms a single probability model. This probability model is designated as a GMM, which can be represented by the following Equation [3], where M is the number of mixtures.

$$p(x) = \sum_{j=1}^{M} p(x|j)P(j) \quad [3]$$

In this model, parameters can be summarized as follows: the mean $\mu_j$, covariance $\Sigma_j$ (or $\sigma_j$), and weight $P(j)$ (or $\omega_j$) of each mixture component j. These parameters are learned using given facial image data x. A learning method is performed to find parameters for allowing a mixture model to most satisfactorily represent the facial image data x, that is, parameters for maximizing a log-likelihood value. A log-likelihood function to be maximized is represented by the following Equation [4], where $\lambda = \{\mu_j, \Sigma_j, \omega_j | j=1, \ldots, M\}$.

$$p(X) = \prod_{i=1}^{N} p(x_i) \quad [4]$$

In order to find the parameters for maximizing the log-likelihood function of Equation [4], the parameters are initialized using K-means, and then an Expectation-Maximization algorithm (hereinafter 'EM algorithm') is used. By means of this algorithm, respective data items are divided into several groups. This clustering procedure is performed according to the following process.

1. M facial image data items are arbitrarily selected and designated as μ of respective groups.

2. The following procedure is repeated until convergence is achieved.

(1) Euclidian distance $\|x_i - \mu_j\|^2$ for each facial image data item i is obtained and is classified as the closest group.

(2) Values μ of respective groups are calculated again using the classified data.

The EM algorithm is executed using the values μ of respective groups, obtained by performing initialization, as initial values, and the parameters are obtained. The EM algorithm is divided into an E-step and an M-step. In E-step, sufficient statistics are predicted, and, in M-step, the parameters are predicted on the basis of the sufficient statistics. Theses E-step and M-step are described below. First, sufficient statistics for each facial image data item, given in E-step, are represented by the following Equation [5].

$$p(j \mid x_i) = \frac{p(x \mid j)P(j)}{\sum_{m=1}^{M} p(x \mid j)P(j)} \quad [5]$$

The parameters are obtained in M-step on the basis of the sufficient statistics obtained in E-step, as in Equation [6].

$$n_j = \sum_{i=1}^{M} P(j \mid x_i) \quad [6]$$

$$E_j(x) = \frac{1}{n_j} \sum_{i=1}^{N} p(j \mid x_i) x_i$$

$$E_j(xx^T) = \frac{1}{n_j} \sum_{i=1}^{N} p(j \mid x_i) x_i x_i^T$$

The EM algorithm is repeated until satisfactory convergence is achieved. Consequently, the parameters $\{\omega_j, \mu_j, \sigma_j \mid j=1 \ldots M\}$ of the probability model for representing a non-user GMM can be obtained through the EM algorithm.

Figure 5:
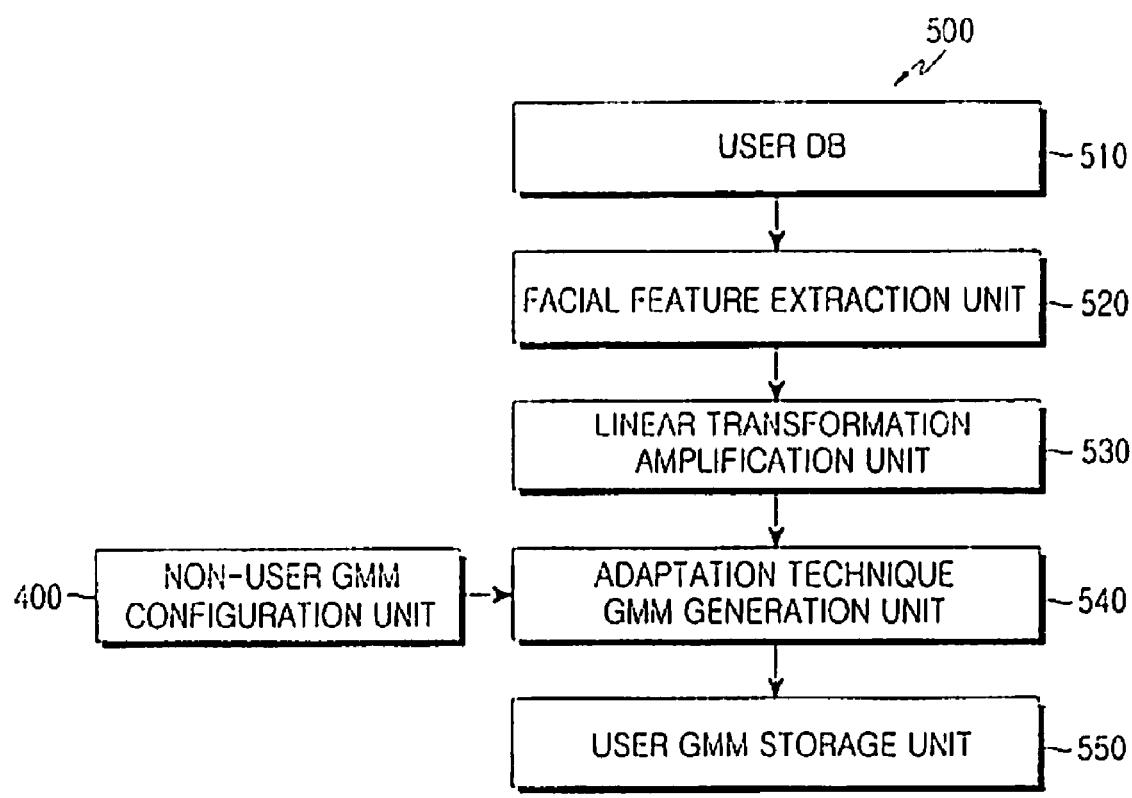
FIG. 5 is a diagram showing the construction of a user GMM configuration unit according to an embodiment of the present invention.

FIG. 5 is a diagram showing the construction of the user GMM configuration unit 500 according to an embodiment of the present invention. Referring to FIG. 5, in a user DB 510, the facial image of a user is registered in advance. A user may be an individual, or a group of users. Similar to FIG. 4, preprocessing and facial feature extraction are performed by a facial feature extraction unit 520 on the facial image registered in the user DB 510. At the time of extracting facial features, a facial feature vector is extracted from an entire facial area, using the entire facial area as a single feature extraction unit, unlike the prior art in which a facial area is divided into a plurality of blocks and facial feature vectors are extracted from the blocks. Therefore, in the present invention, the dimension of the extracted facial feature vector is large, but the number of facial feature vectors is small, and thus the amount of data decreases. In order to compensate for the decrease in the amount of data, a linear transformation amplification unit 530 increases the number of facial feature vectors through linear transformation. The term 'linear transformation amplification' means the use of a light mask. An adaptation technique GMM generation unit 540 generates a user GMM on the basis of an increased number of feature vectors and the non-user GMM, generated by the GMM configuration unit 400. As an adaptation technique, typical relevance adaptation is used. This adaptation technique is divided into the following two procedures.

1. Occupation probability $\gamma_m(x_i)$ for each mixture m is obtained in Equation [7].

$$\gamma_m(x_i) = \frac{\omega_m p_m(x_i)}{\sum_{j=1}^{M} \omega_j p_j(x_i)} \quad [7]$$

2. A user GMM is generated from the non-user GMM on the basis of the occupation probability obtained in this way. The adaptation procedure is represented by the following Equation [8].

$$\omega_{c_m} = \left[ (1-\alpha_m)\omega_{\omega_m} + \alpha_m \frac{\sum_{i=1}^{N} \gamma_m(x_i)}{\sum_{m=1}^{M}\sum_{i=1}^{N} \gamma_m(x_i)} \right] \quad [8]$$

$$\mu_{c_m} = (1-\alpha_m)\mu_{\omega_m} + \alpha_m \frac{\sum_{i=1}^{N} \gamma_m(x_i) x_i}{\sum_{i=1}^{N} \gamma_m(x_i)}$$

$$\sigma^2_{c_m} = (1-\alpha_m)(\sigma^2_{\omega_m} + \mu^2_{\omega_m}) + \alpha_m \frac{\sum_{i=1}^{N} \gamma_m(x_i) x_i^2}{\sum_{i=1}^{N} \gamma_m(x_i)} - \mu^2_{c_m}$$

where $\alpha_m$ is a value required to adjust the weights of the non-user GMM and the registered user GMM and is preset through experiments. The generated user GMM is stored in a user GMM storage unit 550.

Figure 6:
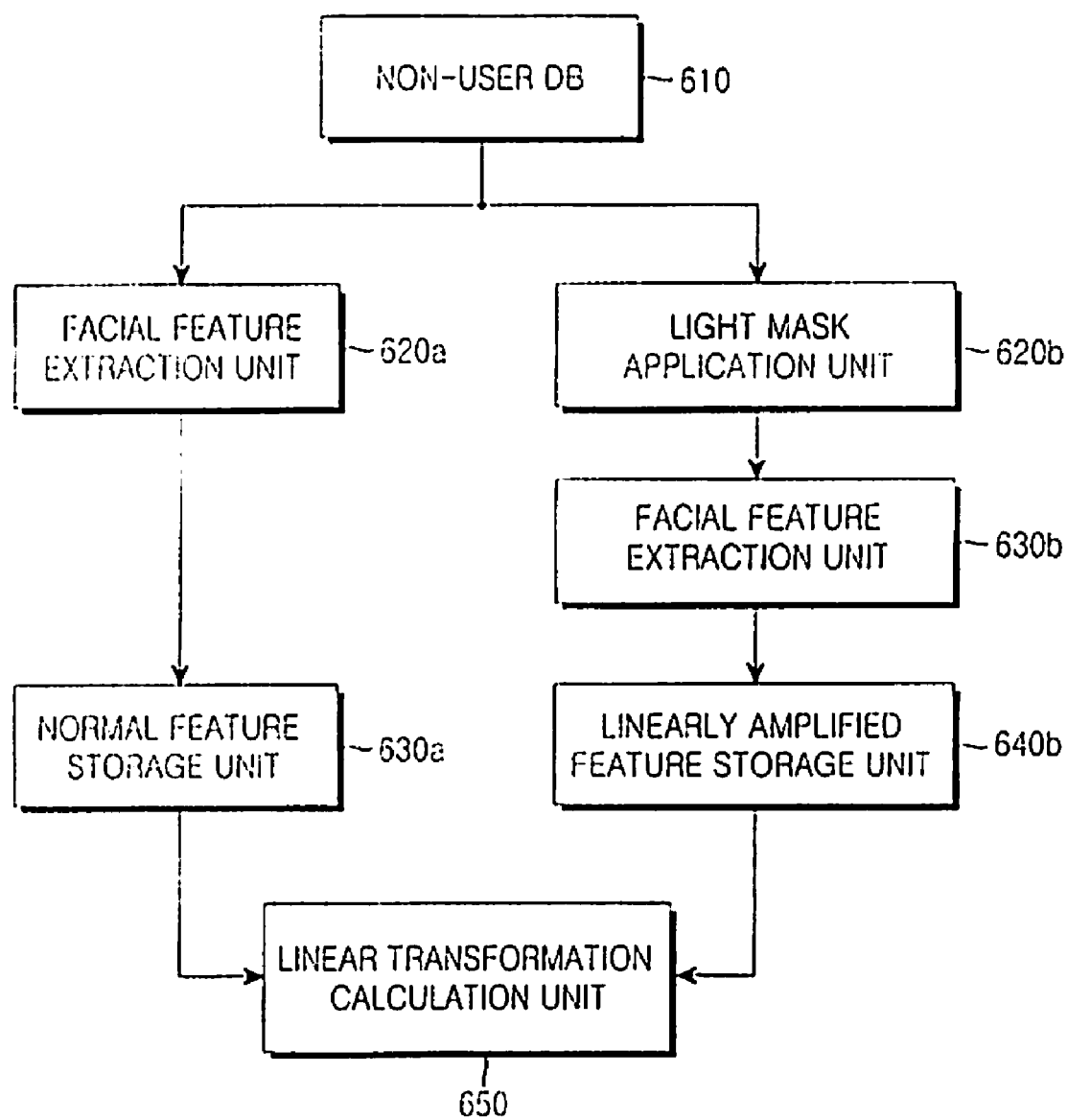
FIG. 6 is a diagram showing linear transformation calculation for a facial image using a light mask according to an embodiment of the present invention.

FIG. 6 is a diagram showing linear transformation calculation for a specific facial image using a light mask according to an embodiment of the present invention. Referring to FIG. 6, preprocessing and feature vector extraction are performed by a facial feature extraction unit 620a on the non-user facial image of a non-user registered in a non-user DB, similar to FIG. 4. A normal feature storage unit 630a receives and stores a facial feature vector. A light mask application unit 620b covers the facial image stored in the non-user DB with light masks for directing illumination in various directions, and thus a facial feature extraction unit 630b extracts facial feature vectors. A linearly amplified feature storage unit 640b stores the facial feature vectors.

A linear transformation calculation unit 650 calculates linear transformations using the differences between the facial feature vectors respectively stored in the normal feature storage unit 630a and the linearly amplified feature storage unit 640b. The linear transformations calculated using the system of FIG. 6 are used when the user GMM is generated.

Figure 7:
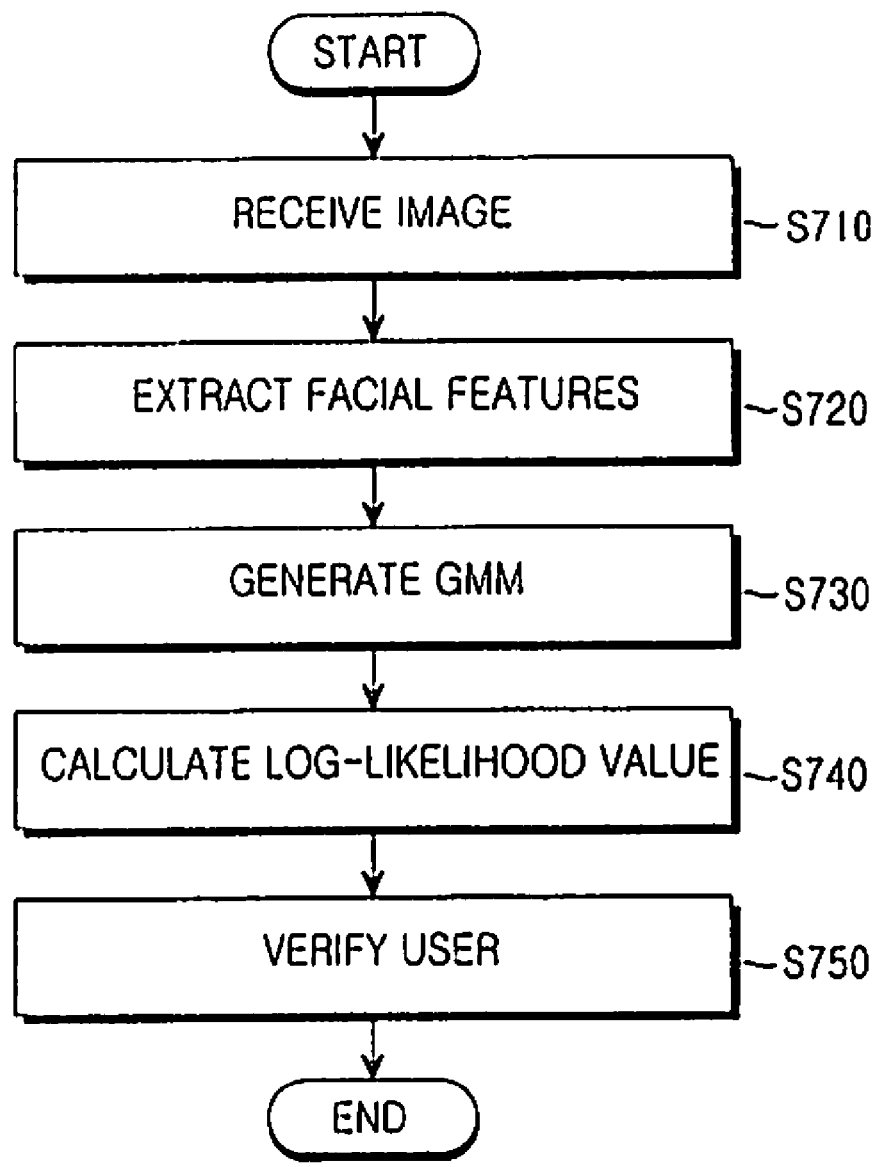
FIG. 7 is a flowchart showing a method of verifying the face of a user using a light mask according to an embodiment of the present invention.

FIG. 7 is a flowchart showing a method of verifying the face of a user using a light mask according to an embodiment of the present invention. Referring to FIG. 7, when, in the image input step S710, a specific facial image is received through the image input unit 310, the feature extraction unit 320 extracts a facial feature vector using the entire facial area of the specific facial image as an extraction unit in facial feature extraction step S720. In log-likelihood value calculation step S740, the facial feature vector, extracted in the facial feature extraction step S720, is input to the non-user GMM and the user GMM, which are respectively stored in the non-user GMM storage unit 440 and the user GMM storage unit 550, and thus log-likelihood values are calculated. The non-user GMM storage unit 440 and the user GMM storage unit 550 store non-user GMMs and user GMMs, which are respectively generated by the non-user GMM configuration unit 400 and the user GMM configuration unit 500. In GMM generation step S730, each user GMM is generated after facial feature vectors are extracted by covering the user facial image of the user, registered in the user DB, with various light masks. Thereafter, in user verification step S750, the log-likelihood values are compared to a threshold, so that verification is performed by determining whether the specific facial image received through the image input unit 310 is the user's face or the non-user's face.

As is apparent from the foregoing description, according to the present invention, facial features are extracted from an entire facial area, without a facial area being divided into blocks and features being extracted from the blocks, thereby performing verification, with the features of the entire facial area sufficiently taken into account.

In addition, light masks are applied to a facial image, so that the amount of data, which is reduced due to the above construction, can be increased, and the verification of a face vulnerable to illumination can be compensated for.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A system for verifying a face of a user by using a light mask, comprising:
    a facial feature extraction unit for extracting a facial feature vector from an entire facial area of a specific facial image;
    a non-user Gaussian Mixture Model (GMM) configuration unit for generating a non-user GMM from a non-user facial image of a non-user;
    a non-user DataBase (DB) for storing the non-user GMM;
    a user GMM configuration unit for generating a user GMM by applying a plurality of varying light masks to a user facial image of a user, wherein the plurality of varying light masks are applied by directing illumination on the user facial image from various directions;
    a user DB for storing the user GMM;
    a log-likelihood value calculation unit for inputting the facial feature vector both to the non-user GMM and to the user GMM, thus calculating log-likelihood values; and
    a user verification unit for comparing the calculated log-likelihood values with a predetermined threshold, thus verifying whether the specific facial image is a facial image of the user.

2. The system of claim 1, further comprising an image input unit for receiving the specific facial image from a camera and transmitting the specific facial image to the facial feature extraction unit.

3. The system of claim 1, wherein the user GMM configuration unit comprises:
    a linear transformation amplification unit for performing linear transformation amplification by applying light masks to the extracted facial feature vector;
    an adaptation technique GMM generation unit for generating the user GMM through the non-user GMM configuration unit by using relevance adaptation.

4. A method of verifying a face of a user by using a light mask, comprising:
    storing a non-user Gaussian Mixture Model (GMM) in a non-user DataBase (DB) and a user GMM in a user DB, the non-user GMM generated from a non-user facial image stored in the non-user DB, the user GMM generated by applying a plurality of varying light masks to a user facial image stored in the user DB, wherein the plurality of varying light masks are applied by directing illumination on the user facial image from various directions;
    extracting a facial feature vector from an entire facial area of a specific facial image, without segmenting the specific facial image into a plurality of regions;
    calculating log-likelihood values by inputting the facial feature vector both to the non-user GMM and to the user GMM; and
    comparing the calculated log-likelihood values with a predetermined threshold, thus verifying whether the specific facial image is a facial image of the user.

5. The method of claim 4, further comprising receiving the specific facial image from a camera.

* * * * *